(12) United States Patent     (10) Patent No.:    US 12,587,353 B2

Yang                     (45) Date of Patent:      Mar. 24, 2026

(54) SIGNAL SAMPLING AND RECONSTRUCTION BELOW THE NYQUIST RATE

(71) Applicant: Western Carolina University, Cullowhee, NC (US)

(72) Inventor: Weiguo Yang, Sylva, NC (US)

(73) Assignee: Western Carolina University, Cullowhee, NC (US)

( * ) Notice: Subject to any disclaimer, the term of this patent is extended or adjusted under 35 U.S.C. 154(b) by 185 days.

(21) Appl. No.: 18/406,173

(22) Filed: Jan. 7, 2024

(65) Prior Publication Data

US 2024/0348418 A1      Oct. 17, 2024

Related U.S. Application Data

(60) Provisional application No. 63/495,892, filed on Apr. 13, 2023.

(51) Int. Cl.
     *H04K 1/10*           (2006.01)
     *H04L 7/00*           (2006.01)

(52) U.S. Cl.
     CPC ................................. *H04L 7/0033* (2013.01)

(58) Field of Classification Search
     CPC .... H04L 7/0033; H04L 69/22; G01R 29/0273
     USPC ........................................ 375/260, 259, 285
     See application file for complete search history.

(56) References Cited

U.S. PATENT DOCUMENTS

| | | | |
|---|---|---|---|
| 7,289,049 B1 | 10/2007 | Fudge et al. | |
| 7,403,875 B2 | 7/2008 | Vogel et al. | |
| 8,228,218 B2 | 7/2012 | Eldar et al. | |
| 9,209,782 B2 | 12/2015 | Ricci et al. | |
| 9,510,787 B2 | 12/2016 | Kniazev et al. | |
| 9,735,800 B2 | 8/2017 | Pagnanelli | |
| 10,213,164 B2 | 2/2019 | Garudadri et al. | |
| 10,432,977 B2 | 10/2019 | Atkins et al. | |
| 10,939,873 B2 | 3/2021 | Garudadri et al. | |
| 2012/0288034 A1* | 11/2012 | Fireaizen ........... | G01R 29/0273 375/340 |
| 2017/0064047 A1* | 3/2017 | Bosshart ................. | H04L 69/22 |

\* cited by examiner

*Primary Examiner* — Phuong Phu

(74) *Attorney, Agent, or Firm* — Coffield Heedy Kilgore PLLC; William G. Heedy

(57) ABSTRACT

A method of reconstructing an input signal includes providing (104) a first sampled signal (110) by sampling an input signal (102) at a sampling rate fs, the sampling rate being less than a Nyquist sampling rate for the input signal, providing a delayed input signal (107), sampling (108) the delayed input signal at the sampling rate to provide a second sampled signal (112), performing (114) a Fourier transform of the first sampled signal and the second sampled signal to provide a first signal spectral component (118) and a second signal spectral component (120), respectively, combining (122) the first signal spectral component and the second signal spectral component to provide a first de-aliased spectral component (124A) and a second de-aliased spectral component (124B), and performing (126) an inverse Fourier Transform on the first de-aliased spectral component and the second de-aliased spectral component to provide a reconstructed signal (128).

18 Claims, 4 Drawing Sheets

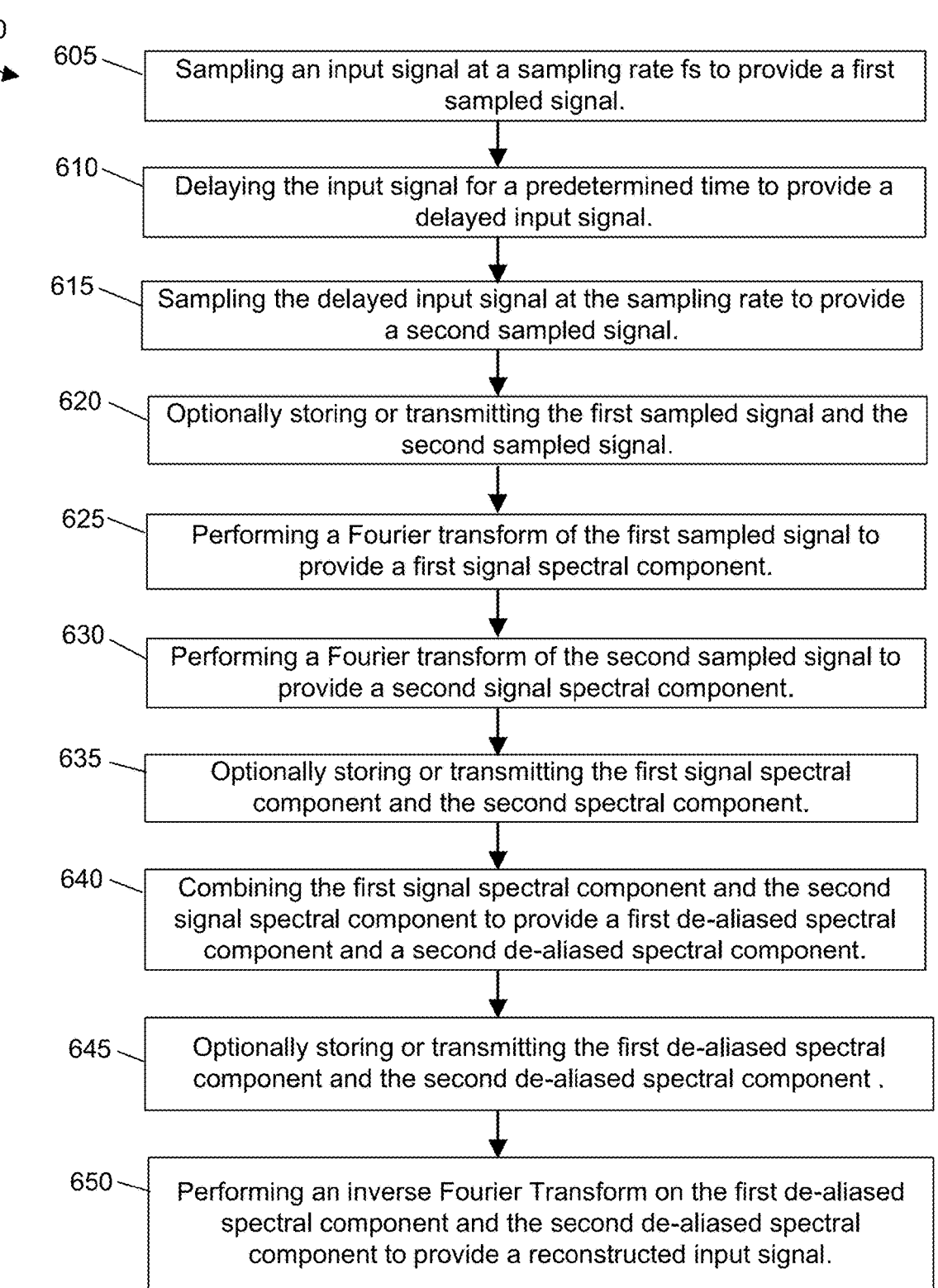

600

605 — Sampling an input signal at a sampling rate fs to provide a first sampled signal.

610 — Delaying the input signal for a predetermined time to provide a delayed input signal.

615 — Sampling the delayed input signal at the sampling rate to provide a second sampled signal.

620 — Optionally storing or transmitting the first sampled signal and the second sampled signal.

625 — Performing a Fourier transform of the first sampled signal to provide a first signal spectral component.

630 — Performing a Fourier transform of the second sampled signal to provide a second signal spectral component.

635 — Optionally storing or transmitting the first signal spectral component and the second spectral component.

640 — Combining the first signal spectral component and the second signal spectral component to provide a first de-aliased spectral component and a second de-aliased spectral component.

645 — Optionally storing or transmitting the first de-aliased spectral component and the second de-aliased spectral component .

650 — Performing an inverse Fourier Transform on the first de-aliased spectral component and the second de-aliased spectral component to provide a reconstructed input signal.

FIG. 6

SIGNAL SAMPLING AND RECONSTRUCTION BELOW THE NYQUIST RATE

CROSS REFERENCE TO RELATED APPLICATIONS

The present application claims the priority of U.S. Provisional Patent Application Ser. No. 63/495,892 filed Apr. 13, 2023, entitled "SIGNAL SAMPLING AND RECONSTRUCTION BELOW THE NYQUIST RATE", which is incorporated herein in its entirety.

BACKGROUND

Digital representation of signals is ubiquitous today, notably propelled by the wide use of digital computers, smart phones, and digital communication systems. Conventional digital samplers use a sampling rate $f_s$ that is at least twice the highest frequency, $f_m$, of the signal, namely, $f_s > 2f_m$, in order to faithfully represent and reproduce an analog signal. This minimum sampling rate, $2f_m$, is commonly referred as the Nyquist rate and this principle is often referred to as the Nyquist criterion. Nyquist criterion is adhered to in conventional designs and implementations where a digital representation of an analog signal is needed, such as, for example, in digital audio systems, digital sampling scopes, digital signal processing systems, and digital communications systems.

If a conventional sampler with a sampling frequency that is below than the Nyquist rate, i.e., $f_s \leq 2f_m$, is used, the original signal is undersampled and the original signal cannot be recovered from the undersampled digital version because of a phenomenon called aliasing. Briefly stated, if aliasing occurs a spurious signal at a lower frequency will be present when trying to recover the original higher frequency signal.

It is possible, however, to faithfully represent and reproduce an analog signal even if the Nyquist criterion is not met, such as the method suggested in U.S. Pat. No. 7,289,049 to Fudge et al., which requires determining several compressed sensing matrices and is, therefore, computationally intensive. Fudge et al. also briefly discusses other types of below-Nyquist-sampling-rate signal reconstruction methods. Some methods which do not comply with the Nyquist criterion require the original signal to be "sparse" signals, i.e., signals which can be determined by a lower dimensional representation than normal signals, thus limiting their applications.

BRIEF DESCRIPTION OF THE DRAWING

FIG. 6 illustrates a method for recovering an original input signal x(t) from two under-sampled versions of the original signal.

DETAILED DESCRIPTION

As discussed herein, the original, arbitrary, signal x(t) can be faithfully recovered from two under-sampled versions of the original signal, using two samplers which have a slower sampling rate, i.e., a below-Nyquist-sampling-rate, $2*f_m > f_s > f_m$.

Figures 1, 2:
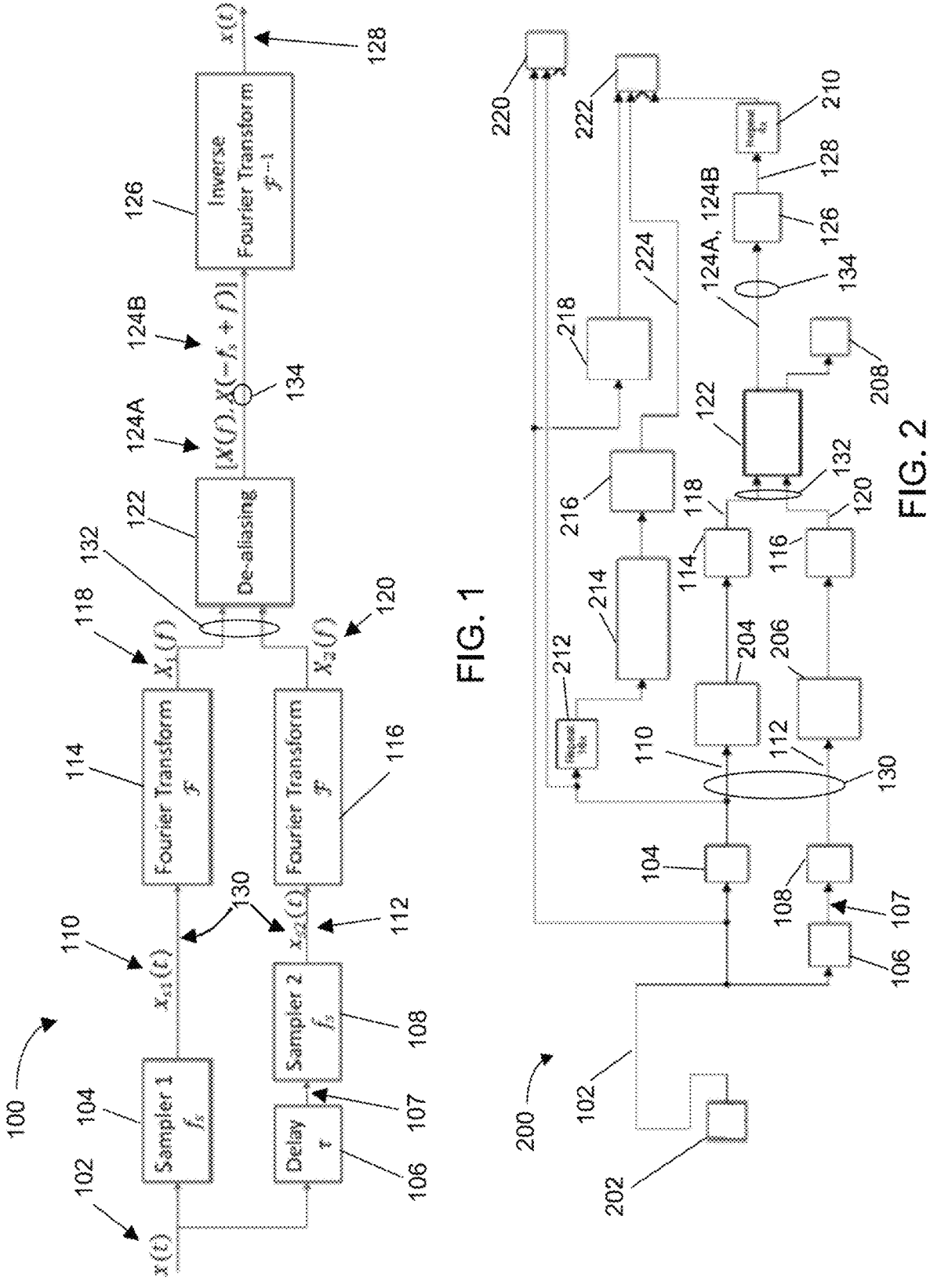
FIG. 1 is a block diagram of a system which recovers an original signal x(t) from two under-sampled versions $x_{s1}(t)$, $x_{s2}(t)$ of the original signal.
FIG. 2 is a block diagram of a Simulink® system for demonstrating operation of the signal sampling and recreation technique discussed herein.

FIG. 1 is a block diagram of a system which recovers an original signal x(t) 102 from two under-sampled versions $x_{s1}(t)$, $x_{s2}(t)$ 110, 112 of the original signal. The original signal 102 is fed to a first sampler 104 which samples at the sampling rate $f_s$ to produce the first under-sampled signal 110. A numerical Fourier Transform is then performed 114 on the first under-sampled signal 110 to provide a first signal spectra $X_1(f)$ 118.

The original signal 102 is also fed to a series combination of a delay circuit 106, which provides a delay time of τ, and a second sampler 108 which samples at the sampling rate $f_s$ to produce the second under-sampled signal 112. The delay circuit 106 causes the second sampler 108 to sample the original signal 102 at a different point than the first sampler 104. For example, if the first and second samplers 104, 108, respectively, both take a sample at the same time, e.g., $t_x$, then the first sampler 104 will sample the original signal 102 at time $t_x$, whereas the second sampler 108 will sample the original signal 102 as it existed τ seconds before time $t_x$. The delay time τ is much shorter than the period ($1/f_s$) between samples. A Fourier Transform is then performed 116 on the second under-sampled signal 112 to provide a second signal spectra $X_2(f)$ 120. The Fourier Transforms are preferably Fast Fourier Transforms (FFT).

Thus, two slower speed samplers 104, 108 are used rather than a single higher speed sampler which operates at the Nyquist rate and which will be more expensive, will be more power-hungry, and/or which will generate more heat.

In an embodiment, the delay time is one-half of the period ($1/f_s$) between samples.

In an embodiment, the delay time τ is between zero and one time of the period ($1/f_s$) between samples.

In an embodiment, the delay time τ is one-fourth of the period ($1/f_s$) between two slower samples.

If the Fourier transform of the undersampled version 110 of the original signal 102 is denoted as spectral component $X_1(f)$ 118 and the Fourier transform of the undersampled version 112 of a delayed version 107 of the original signal 102 is denoted as spectral component $X_2(f)$ 120, the spectral component of the original signal 102 is denoted as X(f) 124A, and the spectral component of a frequency-shifted version of the original signal 102 is denoted as $X(-f_s+f)$ 124B, then:

$$X_1(f) = X(f) + X(-f_s + f)$$

$$X_2(f) = e^{-jf\tau}X(f) + e^{j(-f_s+f)\tau}X(-f_s + f)$$

Rearranging the equations above to solve for spectral components X(f) 124A and $X(-f_s+f)$ 124B provides:

$$X(f) = \frac{e^{-j(-f_s+f)\tau}X_1(f) - X_2(f)}{e^{-jf\tau}\left(e^{-jf_s\tau} - 1\right)}$$

-continued $$X(-f_s + f) = \frac{X_2(f) - e^{-jf\tau}X_1(f)}{e^{-jf\tau}\left(e^{-jf_s\tau} - 1\right)}$$

The first and second spectral components 118, 120 are provided to a de-aliasing filter 122 which combines the first and second spectral components 118, 120 to resolve spectral components 124A and 124B. This effectively de-aliases spectral components 124A and 124B.

The delay τ is set and, therefore, known, and the Fourier spectrum, i.e., the output of the Fourier transform X(f) of de-aliased original signal 102, can be determined in real time. In FIG. 1, this is achieved by the Fourier transform blocks 114 and 116. The value "f" is thus determined by the Fourier transform of the input signals, so the quantities exp(−jfτ) and exp(−j(−f_s+f)τ) can be computed.

The input signal can be represented in the time domain as a signal varying in time t, and equivalently can be represented in the frequency domain as varying in frequency f. A multi-frequency input signal will have non-zero amplitudes at multiple frequencies, e.g., f=$f_1$, $f_2$, . . . $f_n$, or, in general, at frequencies in a frequency range of $0 < f < f_m$.

Spectral components 124A and 124B are then provided to an Inverse Fourier Transform circuit 126, which combines these spectral components to provide the recreated version x(t) 128 of the input signal 102. The Inverse Fourier Transform is preferably an Inverse Fast Fourier Transform (IFFT).

X(f) provides the signal spectrum below $f_s/2$ and X(−f_s+ f), which is an aliased version of X(f) for f>$f_s/2$, provides the signal spectrum above $f_s/2$. X(f) and X(−f_s+f) are concatenated to form the full spectrum of x(t) and thus allow the inverse Fourier transform to recover the input signal x(t).

FIG. 2 is a block diagram of a Simulink® system 200 for demonstrating operation of the signal sampling and recreation technique discussed herein. The "Waveform Generator" 202 simulates the input signal 102. Two slower samplers, "Downsample" 104 and "Downsample 1" 108, separated by a time delay block "z⁻⁴" 106, sample the input signal 102 at a sampling rate $f_s$ that is lower than the Nyquist rate. The undersampled signals 110, 112 are provided to accumulator/buffers 204, 206, respectively, to facilitate the Fourier transform operation, which is performed by the "FFT" blocks 114, 116, respectively. The "fcn" block 122 provides the de-aliasing, implemented by the equations shown above. The de-aliased signal spectra 124A, 124B are inverse Fourier transformed by the "IFFT" block 126 to recreate the signal 128 in the time domain.

In the Simulink® system 200 the original signal 102 is generated at a much higher simulation rate $f_{sim}$ than the slower sampling rate $f_s$ and, in this simulation, the delay block 106 provides a delay of 4/$f_{sim}$ so that the first and second samplers 104, 108 sample the original input signal 102 at different times, as mentioned above.

A delay time τ of other than 4/$f_{sim}$ (z⁻⁴) may be used as long as it is shorter than the sampling period (1/$f_s$).

In the Simulink® system 200 observation points and buffers are denoted as 204, 206, 216, and 218, and signal displays are denoted as 208, 220, and 222. The delays 210 and 212 compensate for processing delays so that various signals can be synchronized for presentation on a display for comparison, as in FIGS. 3, 4, and 5. The lowpass filter 214 creates a signal 224 from the undersampled input signal 110 (or 112) for a comparison as shown in FIG. 5.

Figure 3:
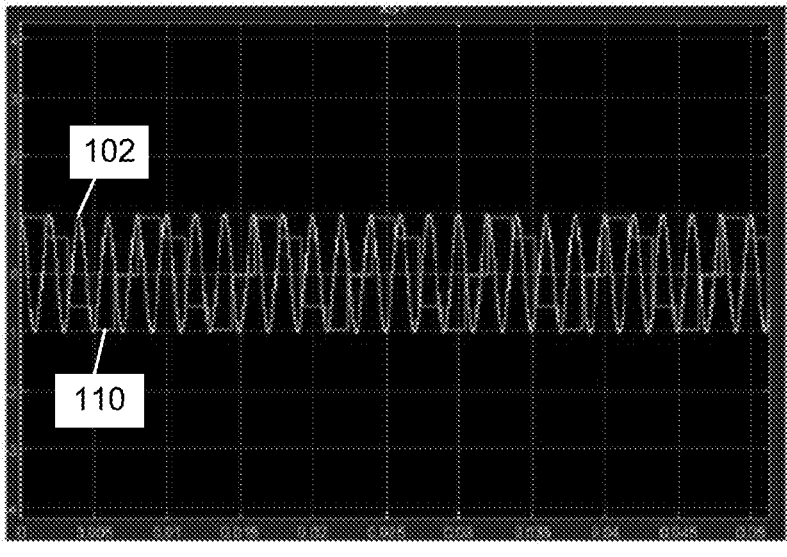
FIG. 3 illustrates a single frequency signal from the "Waveform Generator" and the under-sampled digital version from the sampler "Downsample".

FIG. 3 illustrates a single frequency signal 102 from the "Waveform Generator" 202 and the under-sampled digital version 110 from the sampler "Downsample" 104. In this example the sample rate $f_s$ is 5/4 the frequency of the input signal 102, thus being far below the Nyquist frequency. The under-sampled digital version 110 does not reflect the original signal 102 and follows a pattern of much lower frequency. Attempting to recover the original signal 102 by passing the under-sampled digital version 110 through a low pass filter (with a high enough cutoff frequency to pass the original signal 102), results in a spurious lower frequency signal, i.e., an alias, being introduced. In this example that spurious signal would have frequency which is ¼ the frequency of the input signal 102, and would be a distorted sinusoid as well.

Figure 4:
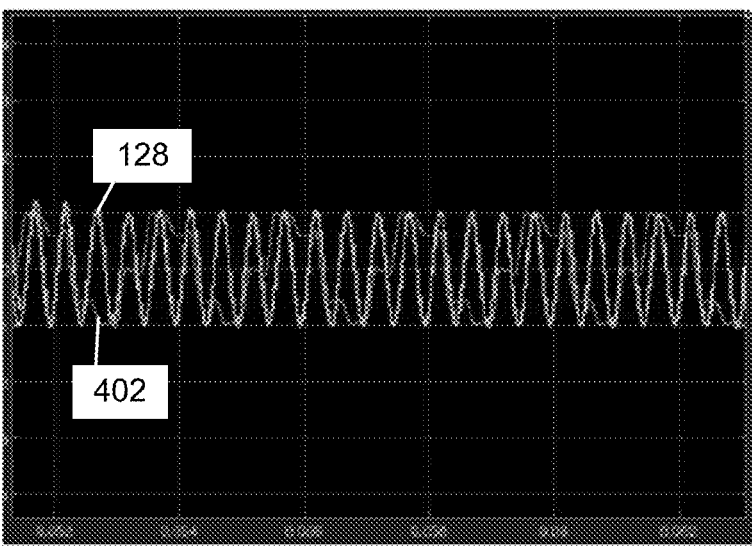
FIG. 4 illustrates the recreated signal and a signal recreated using only the under-sampled signal.

FIG. 4 illustrates the recreated signal 128 and a signal 402 recreated using only the under-sampled signal 110. As can be seen, the signal 402 has a frequency which is ¼ the frequency of the input signal 102, and is a distorted sinusoid as well.

Figure 5:
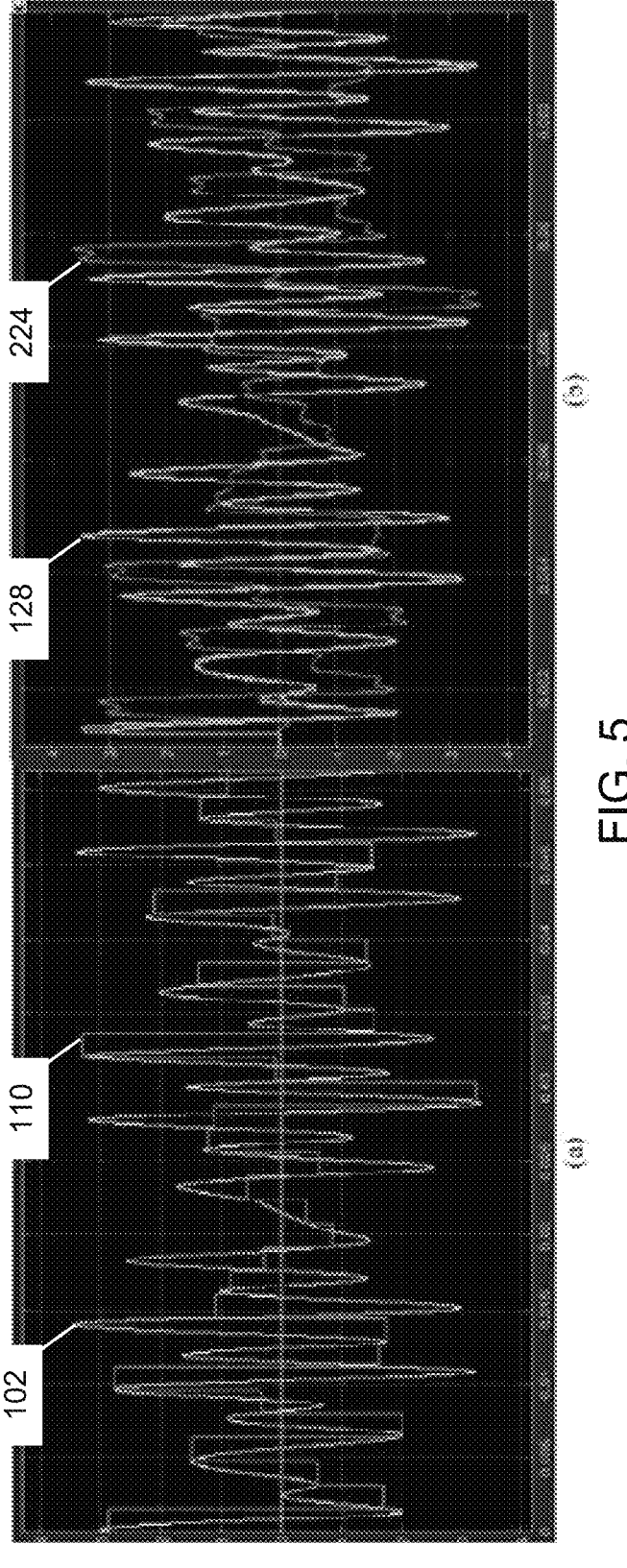
FIG. 5 illustrates a more complicated recreated signal and a signal recreated using only a single sampler.

FIG. 5 illustrates a similar comparison with a more complicated signal, showing on the left side (a), the original signal waveform 102 and its under sampled digital version 110, and showing on the right side (b), the reconstructed signal 128 using both samplers 104 or 108 and the processing of FIG. 1, and the reconstructed signal 224 using only a single sampler 104 (or 108) and the lowpass filter 214 of FIG. 2.

FIG. 6 illustrates a method 600 for recovering an original input signal x(t) 102 from two under-sampled versions $x_{s1}$(t), $x_{s2}$(t) 110, 112 of the original signal. The method 600 includes sampling 605 an input signal 102 at a sampling rate $f_s$ to provide a first sampled signal 110, the sampling rate $f_s$ being less than a Nyquist sampling rate for the input signal, delaying 610 the input signal 102 for a predetermined time to provide a delayed input signal 107, sampling 615 the delayed input signal 107 at the sampling rate $f_s$ to provide a second sampled signal 112, performing 625 a Fourier transform of the first sampled signal 110 to provide a first signal spectral component 118, performing 630 a Fourier transform of the second sampled signal 112 to provide a second signal spectral component 120, combining 640 the first signal spectral component 118 and the second signal spectral component 120 to provide a first de-aliased spectral component 124A and a second de-aliased spectral component 124B, and performing 650 an inverse Fourier Transform on the first de-aliased spectral component 124A and the second de-aliased spectral component 124B to provide a reconstructed input signal 128.

It may be desirable, in some environments, to store information for further processing at a different time and/or a remote location. Therefore, the method 600 also provides for optionally storing 620 the first sampled signal 110 and the second sampled signal 112 (collectively 130 in FIGS. 1 and 2) so that one or more of steps 625 and following may be performed using the stored and/or transmitted data 110, 112.

It may be desirable, in some environments, to store information for further processing at a different time and/or a remote location. Therefore, the method 600 also provides for optionally storing 635 the first signal spectral component 118 and the second signal spectral component 120 (collectively 132 in FIGS. 1 and 2) so that one or more of steps 640 and following may be performed using the stored and/or transmitted data 118, 120.

It may be desirable, in some environments, to store information for further processing at a different time and/or a remote location. Therefore, the method 600 also provides for optionally storing 645 the first de-aliased spectral component 124A and the second de-aliased spectral component 124B (collectively 134 in FIGS. 1 and 2) so that step 650 and any desired further steps may be performed using the stored and/or transmitted data 124A, 124B.

Given the ubiquitous applications of digital signals sampled from analog signals in today's world, the limitations imposed by the Nyquist rate are greatly disadvantageous. That is, as predicted by the Nyquist criterion, a single under-sampled version of a signal cannot recover the original signal, thus requiring the use of higher-speed samplers (along with their associated higher frequencies, higher buffer storage requirements, higher cost, and higher power and heat dissipation requirements).

The apparatus and process discussed herein, however, use two under-sampled versions of a signal, with one of the versions being a delayed version, and then use de-aliasing to faithfully recreate the original signal, thereby overcoming the limits and burdens imposed by the Nyquist rate. The apparatus and process discussed herein therefore have many wide-ranging uses and applications, extend capabilities of current devices, and/or lower costs and other requirements, while still providing the same signal fidelity and system performance as conventional systems.

The apparatus and process discussed herein demonstrate and implement a signal reconstruction scheme that uses slower samplers which use a sampling frequency that is lower than that required by the Nyquist rate.

One high-impact use case is high speed signal testing and measurements. Currently, the instruments that can capture and measure the fastest signal waveform are digital sampling scopes. Due to the requirement of the Nyquist rate, the highest speed of the signal a digital sampling scope can faithfully capture and measure has to be slower than one-half of the sampling rate of the digital sampling head. The most advanced digital sampling scopes currently available sample at a 50 GHz to 70 GHz sampling rate and, therefore, conventionally, the highest speed of the signal one can characterize and measure is 25 GHz to 35 GHz. For signals of higher speed, there is no current conventional technology which can faithfully characterize and measure them. The apparatus and process discussed herein extend the range of the highest speed of the signal that one can faithfully capture and measure, using existing sampling heads, by a factor of up to 2, that is, to 50 GHz to 70 GHz.

Another high-impact use case is in high fidelity (Hi-Fi) digital audio applications. The expensive high-speed (96 kHz and above), high-precision audio digitizers can be replaced by the lower-speed audio digitizers with the same precision, which is much easier to implement and therefore less costly, while achieving the same high audio quality and performance.

Another high-impact use case is in high-speed, high throughput digital communication systems, including wireless and optical systems, such as 5G and 6G networks. Broad-band high-speed waveforms can be digitized by lower cost, lower speed digitizers without sacrificing the data rate and performance, or, alternatively, can digitize signals having twice the frequency while still using current highest sampling rate digitizers.

As described herein, a method of reconstructing an input signal includes:

provioding 104 a first sampled signal 110 by sampling an input signal 102 at a sampling rate $f_s$, the sampling rate being less than a Nyquist sampling rate for the input signal;

providing a delayed input signal 107 by delaying the input signal for a predetermined time;

sampling 108 the delayed input signal at the sampling rate to provide a second sampled signal 112;

performing 114 a Fourier transform of the first sampled signal to provide a first signal spectral component 118;

performing 116 a Fourier transform of the second sampled signal to provide a second signal spectral component 120;

combining 122 the first signal spectral component and the second signal spectral component to provide a first de-aliased spectral component 124A and a second de-aliased spectral component 124B; and performing 126 an inverse Fourier Transform on the first de-aliased spectral component and the second de-aliased spectral component to provide a reconstructed signal 128.

Also as described herein, an apparatus for reconstructing an input signal includes:

a first sampler 104 to sample an input signal 102 at a sampling rate $f_s$ to provide a first sampled signal 110, the sampling rate being less than a Nyquist sampling rate for the input signal;

a delay 106 to provide a delayed input signal 107;

a second sampler 108 to sample the delayed input signal at the sampling rate to provide a delayed second sampled signal 112;

a first Fourier transform device 114 responsive to the first sampled signal to provide a first signal spectral component 118;

a second Fourier transform device 116 responsive to the delayed second sampled signal to provide a second signal spectral component 120;

a de-aliasing device 122 to combine the first signal spectral component and the second signal spectral component to provide a first de-aliased spectral component 124A and a second de-aliased spectral component 124B; and an Inverse Fourier Transform device 126 to perform an inverse Fourier Transform on the first de-aliased spectral component and the second de-aliased spectral component to provide a reconstructed signal 128.

Preferably, the Fourier Transform is a Fast Fourier Transform.

Preferably, the Inverse Fourier Transform is an Inverse Fast Fourier Transform.

Preferably, the delay is less than the inverse of the sampling frequency.

Preferably, the first signal spectral component and the second signal spectral component are combined by concatenating them.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations may be well known in the art, and because they do not facilitate a better understanding of the present disclosure, a discussion of such elements and operations is not provided herein. The present disclosure is deemed to inherently include all such elements, variations, and modifications to the described aspects that would be known to those of ordinary skill in the art, particularly in view of reading the present disclosure. Any headings used herein are for organizational purposes only and are not meant to be used to limit the scope of the description or the claims.

The terminology used herein is for the purpose of describing particular example embodiments or implementations only and is not intended to be limiting. As used herein, the singular forms "a", "an", and "the" may be intended to include the plural forms as well, unless the context clearly indicates otherwise.

The terms "comprises," "comprising," "includes," "including," "has," "having," and variations in form thereof are inclusive or variations in form thereof are intended to be inclusive in a manner similar to the term "comprises" as that term is interpreted when employed as a transitional word in a claim, and therefore specify the presence of stated features, integers, steps, operations, elements, and/or components, but do not preclude the presence or addition of one or more other features, integers, steps, operations, elements, components, and/or groups thereof unless explicitly stated otherwise or the context clearly requires otherwise.

The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments and implementations.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments and implementations are contemplated, described herein, and set forth in the claims.

The term "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

The terms "includes," "has," "having," or "exhibits," or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items.

As used herein, phrases such as "between X and Y" and "between about X and Y" should be interpreted to include X and Y unless expressly stated otherwise or the context clearly indicates otherwise.

Terms such as "about", "approximately", "around", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While terms such as vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments and implementations preferably or optionally include certain features, elements and/or steps, while some other embodiments and implementations optionally do not include those certain features, elements and/or steps. Thus, such conditional language indicates, in general, that those features, elements and/or steps are used in a permissive sense rather than a mandatory sense, and may not be required for every implementation or embodiment.

The subject matter described herein is provided by way of illustration only and should not be construed as limiting the nature and scope of the claims herein. While different embodiments and implementations have been provided above, it is not possible to describe every conceivable combination of components or methodologies for implementing the disclosed subject matter, and one of ordinary skill in the art may recognize that further combinations and permutations that are possible. Furthermore, the nature and scope of the claims is not necessarily limited to implementations that solve any or all disadvantages which may have been noted in any part of this disclosure. Various modifications and changes may be made to the subject matter described herein without departing from the spirit and scope of, the exemplary embodiments, implementations, and applications illustrated and described herein.

Although the subject matter presented herein has been described in language specific to components used therein, it is to be understood that the scope of the claims is not necessarily limited to the specific components or characteristics thereof described herein; rather, the specific components and characteristics thereof are disclosed as example forms of implementing the disclosed subject matter. Accordingly, the disclosed subject matter is intended to embrace all alterations, modifications, and variations, that fall within the scope and spirit of any claims included herein or that may be written.

The foregoing description and figures are intended only to convey to a person having ordinary skill in the art the fundamental aspects of the disclosed subject matter and are not intended to limit, and should not be construed as limiting, the scope of any present or future claims. Further, in the foregoing Detailed Description, various features may be grouped together in a single embodiment or implementation for the purpose of streamlining the disclosure. This method of disclosure is not to be interpreted as reflecting an intention that a claimed embodiment, implementation, or application requires more features than are expressly recited in a present or future claim. Rather, present and future claims reflect patentable subject matter which may lie in less than all features of a single disclosed embodiment, implementation, or application.

The invention claimed is:

1. A method of processing an input signal, the method comprising:
   providing a first sampled signal by sampling an input signal at a sampling rate $f_s$, the sampling rate being less than a Nyquist sampling rate for the input signal;
   providing a delayed input signal by delaying the input signal by a delay time;
   sampling the delayed input signal at the sampling rate to provide a second sampled signal;
   performing a Fourier transform of the first sampled signal to provide a first signal spectral component;
   performing a Fourier transform of the second sampled signal to provide a second signal spectral component; and
   combining the first signal spectral component and the second signal spectral component to provide a first de-aliased spectral component and a second de-aliased spectral component.

2. The method of claim 1, wherein the first signal spectral component and the second signal spectral component are combined by concatenation.

3. The method of claim 1, and further comprising:
   performing an inverse Fourier Transform on the first de-aliased spectral component and the second de-aliased spectral component to provide a reconstructed signal.

4. The method of claim 3, wherein the Inverse Fourier Transform is an Inverse Fast Fourier Transform.

5. The method of claim 1, wherein the Fourier Transform is a Fast Fourier Transform.

6. The method of claim 1, wherein the delay time is less than an inverse of the sampling rate.

7. The method of claim 1, wherein the delay time is approximately one-half of a period between samples.

8. The method of claim 1, wherein the delay time is approximately one-fourth of a period between samples.

9. An apparatus for reconstructing an input signal, the apparatus comprising:
   a first sampler to sample an input signal at a sampling rate $f_s$ to provide a first sampled signal, the sampling rate being less than a Nyquist sampling rate for the input signal;
   a delay device to provide a delayed input signal;
   a second sampler to sample the delayed input signal at the sampling rate to provide a delayed second sampled signal;
   a first Fourier transform device responsive to the first sampled signal to provide a first signal spectral component;
   a second Fourier transform device responsive to the delayed second sampled signal to provide a second signal spectral component; and
   a de-aliasing device to combine the first signal spectral component and the second signal spectral component to provide a first de-aliased spectral component and a second de-aliased spectral component.

10. The apparatus of claim 9, wherein the de-aliasing device combines the first signal spectral component and the second signal spectral component by concatenating them.

11. The apparatus of claim 9, and further comprising:
    an Inverse Fourier Transform device to perform an inverse Fourier Transform on the first de-aliased spectral component and the second de-aliased spectral component to provide a reconstructed signal.

12. The apparatus of claim 11, wherein the Inverse Fourier Transform device is an Inverse Fast Fourier Transform device.

13. The apparatus of claim 9, wherein at least one of the first Fourier transform device or the second Fourier transform device is a fast Fourier transform device.

14. The apparatus of claim 9, wherein the delay device provides a delay of less than the inverse of the sampling frequency.

15. The apparatus of claim 9, wherein the delay device provides a delay of approximately one-half of a period between samples.

16. The apparatus of claim 9, wherein the first sampler and the second sampler are only capable of operation using a sampling rate below the Nyquist sampling rate.

17. A method of processing an input signal, the method comprising:
    providing a first sampled signal by sampling an input signal at a sampling rate $f_s$, the sampling rate being less than a Nyquist sampling rate for the input signal;

providing a delayed input signal by delaying the input
  signal by a delay time;

sampling the delayed input signal at the sampling rate to
  provide a second sampled signal;

performing a Fourier transform of the first sampled signal
  to provide a first signal spectral component;

performing a Fourier transform of the second sampled
  signal to provide a second signal spectral component;

combining the first signal spectral component and the
  second signal spectral component to provide a first
  de-aliased spectral component and a second de-aliased
  spectral component; and performing an inverse Fourier Transform on the first
  de-aliased spectral component and the second
  de-aliased spectral component to provide a recon-
  structed signal.

18. The method of claim 17, wherein at least one of (a) the
first sampled signal and the second sampled signal, (b) the
first signal spectral component and the second signal spec-
tral component, or (c) the first de-aliased spectral component
and the second de-aliased spectral component, are stored for
subsequent processing to provide the reconstructed signal.

\* \* \* \* \*